US 11,486,561 B2

(12) United States Patent
Miedl et al.

(10) Patent No.: US 11,486,561 B2
(45) Date of Patent: Nov. 1, 2022

(54) AREA LIGHT DECORATIVE ELEMENT WITH OPTICALLY ACTIVATABLE SYMBOL BODY

(71) Applicant: Bayerische Motoren Werke Aktiengesellschaft, Munich (DE)

(72) Inventors: Florian Miedl, Moosburg an der Isar (DE); Thomas Tille, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/290,275

(22) PCT Filed: Oct. 10, 2019

(86) PCT No.: PCT/DE2019/100880
§ 371 (c)(1),
(2) Date: Apr. 30, 2021

(87) PCT Pub. No.: WO2020/088712
PCT Pub. Date: May 7, 2020

(65) Prior Publication Data
US 2021/0356096 A1   Nov. 18, 2021

(30) Foreign Application Priority Data

Oct. 30, 2018   (DE) .......................... 102018127060.7

(51) Int. Cl.
*F21V 9/32* (2018.01)
*B60Q 3/54* (2017.01)
(Continued)

(52) U.S. Cl.
CPC ................. *F21V 9/32* (2018.02); *B60Q 3/54* (2017.02); *B60Q 3/68* (2017.02); *F21V 23/0485* (2013.01);
(Continued)

(58) Field of Classification Search
CPC ......... G09F 2013/222; G09F 2013/225; G09F 2013/227; G09F 13/22; B60Q 3/54; F21V 9/32; F21V 23/0485
See application file for complete search history.

(56) References Cited

U.S. PATENT DOCUMENTS 8,789,989 B2 *   7/2014   Demma ................. G02B 6/006
362/489
8,882,317 B2 *   11/2014   Demma ............... H03K 17/962
362/489
(Continued)

FOREIGN PATENT DOCUMENTS

DE   102006026869 A1   12/2007
DE   102013006147 A1   10/2014
(Continued)

OTHER PUBLICATIONS

Machine Translation for DE 2006026869 A1 (Year: 2007).*

*Primary Examiner* — Robert J May
(74) *Attorney, Agent, or Firm* — 2SPL Patent Attorneys PartG mbB; Kieran O'Leary

(57) ABSTRACT

The invention relates to an area light decorative element (1) comprising an optically activatable symbol body (2) at least partially formed of a transparent optically activatable first material (9) and configured to emit visible light in response to the optically activatable symbol body (2) being excited with electromagnetic radiation in a predetermined first frequency range, a light element (3) consisting of a transparent material, wherein the optically activatable symbol body (2) is arranged in the light element (3), a touch-sensitive surface (4) disposed in a first area (5) of a surface of the light element (3) above the optically activatable symbol body (2) for detecting a touch of a user in the first area (5), and an illumination unit (6) which is arranged to emit visible light in a predetermined visible frequency range (22) into the light (Continued)

element (3) and, together with the visible light, also to emit electromagnetic radiation in the predetermined first frequency range into the light element (3).

10 Claims, 2 Drawing Sheets

(51) Int. Cl.
  *B60Q 3/68* (2017.01)
  *F21V 23/04* (2006.01)
  *G06F 3/01* (2006.01)
  *G09F 13/22* (2006.01)
  *F21Y 115/15* (2016.01)
(52) U.S. Cl.
  CPC ............... *G06F 3/01* (2013.01); *G09F 13/22* (2013.01); *F21Y 2115/15* (2016.08); *G09F 2013/222* (2013.01)

(56) References Cited

U.S. PATENT DOCUMENTS

| | | | |
|---|---|---|---|
| 9,982,780 B2 | 5/2018 | Salter et al. | |
| 10,098,198 B2* | 10/2018 | Huebner | B60Q 3/82 |
| 2012/0051067 A1* | 3/2012 | Murray | B60Q 3/14 |
| | | | 29/592.1 |
| 2012/0257416 A1 | 10/2012 | Demma | |

FOREIGN PATENT DOCUMENTS

| | | |
|---|---|---|
| DE | 102014209470 A1 | 11/2015 |
| DE | 102017124365 A1 | 4/2018 |
| EP | 2508383 A1 | 10/2012 |

* cited by examiner

AREA LIGHT DECORATIVE ELEMENT WITH OPTICALLY ACTIVATABLE SYMBOL BODY

CROSS-REFERENCE TO RELATED APPLICATIONS

This application is a 35 U.S.C. § 371(c) national stage entry of PCT/DE2019/100880, filed on Oct. 10, 2019. That application claimed priority to German Application 10 2018 127 060,7 filed on Oct. 30, 2018. The contents of the earlier filed applications are incorporated by reference herein in their entirety.

FIELD

The invention relates to an area light decorative element. Decorative surfaces in vehicles may be illuminated, for example, by contour lighting, indirect lighting or integrated area lighting.

BACKGROUND

Decorative surfaces are also increasingly being equipped with operating functions. These operating functions must be identifiable by means of a symbol.

The symbols for identifying operating positions for activating the operating functions for decors that may be illuminated may only be executed statically up to now. This means that the symbols themselves are not implemented luminously. However, it would be advantageous to have symbols that may be illuminated depending on the ambient light. However, a combination of area light decorations with touch operation and situationally illuminated symbols has not yet been feasible.

From DE102013006147 A1, a decorative element is known in which a luminous body comprises a plurality of light elements which may be excited by an electromagnetic radiation to emit light. The luminous body is configured purely as a decorative element.

From DE102017124365A1 a vehicle switch is known, which comprises a luminescent structure to display a symbol on the switch. However, such a switch is not suitable as an area light decorative element, as only the symbol is illuminated.

A light system is known from DE102017126795A1 by which, for example, a luminescent structure in a window of a vehicle is excited to light up by a light strip.

Area light decorative elements are preferably arranged in a vehicle in such a way that the interior of the vehicle is accentuated or uniformly illuminated. To achieve this, it is advantageous if the area light decorative element is arranged at certain positions of the vehicle. This may lead to a conflict, as vehicle operating elements often have to be arranged in corresponding areas. If area light decorative elements are combined with switches or a touch-sensitive sensor system, it is still necessary to mark the area to be touched so that operation by a user is possible. Since the area light decorative element emits light per se, this is usually achieved by marking an area that is touch-sensitive by the fact that no light is emitted in this area, or by the fact that less light is emitted in this area, which may be done, for example, by shading the decorative element with an appropriate symbol.

SUMMARY

According to the invention, it is possible to emit light required for illuminating the interior of the vehicle, as well as to emit light for marking specific areas on a touch-sensitive surface. This means that no dark areas on the area light decorative element result. The area light decorative element according to the invention also makes it possible both to provide decorative illumination of surfaces in a vehicle interior, and to enable these surfaces to be used to activate or deactivate vehicle functions.

An inventive area light decorative element comprises an optically activatable symbol body at least partially formed of a transparent optically activatable first material and configured to emit visible light in response to the optically activatable symbol body being excited with electromagnetic radiation in a predetermined first frequency range, a light element consisting of a transparent material, wherein the optically activatable symbol body is arranged in the light element, a touch-sensitive surface disposed in a first area of a surface of the light element above the optically activatable symbol body for selecting a touch of a user in the first area, and an illumination unit which is configured to emit visible light in a predetermined visible frequency range into the light element and, together with the visible light, also to emit electromagnetic radiation in the predetermined first frequency range into the light element.

An area light decorative element is a structural unit which is arranged in an interior of a vehicle and makes it possible to illuminate the interior of the vehicle or to illuminate at least an area in the interior of the vehicle.

The area light decorative element is preferably arranged in a trim strip in an environment of a vehicle passenger or is at the same time a trim strip. The area light decorative element is preferably arranged at an inner side of a vehicle door or arranged in a cockpit area of the vehicle in front of the driver or the passenger of the vehicle. Further preferably, the area light decorative element is arranged at the vehicle headliner, in particular directly above the windshield or above the side windows of the vehicle. The area light decorative element is particularly suitable for adapting an illumination in the interior of the vehicle to a desired specification, for example in order to create a certain atmosphere in the interior of the vehicle by illuminating a surface of the area light decorative element.

In particular, the optically activatable symbol body is a three-dimensional body which is at least partially made of the first material, which is a transparent optically activatable material. In this context, optically activatable means that the first material emits visible light in response to being excited with electromagnetic radiation in a predetermined first frequency range. The predetermined first frequency range is a different frequency range than the frequency range of the visible light emitted by the activatable symbol body.

The light element is an element which is made of a transparent material, at least in the area where the symbol body is arranged, so that a view of the symbol body is possible when the same emits visible light. The light element is a support element for the activatable symbol body. This is preferably cast into the light element, e.g., manufactured together with the light element by an injection moulding process. The activatable symbol body thereby preferably extends over a partial area of a footprint of the light element. The light element may further include regions formed of non-transparent material, for example, to embed associated electronics into the area light decorative element.

On the light element a touch-sensitive surface is disposed in a first area of a surface of the light element above the optically activatable symbol body for detecting a touch of a user in a first area. The fact that the first area of the surface of the light element is arranged above the optical symbol body is to be understood as meaning that the first area is arranged in front of the symbol body on a surface of the light element, as seen by a user.

Touch input by a user is enabled by the touch-sensitive surface disposed in the first area. In this regard, the area light decorative element responds to a touch input when the touch input occurs in the first area. In other words, this means that the touch-sensitive surface detects an input when a user touches the area light decorative element in the area of the optically activatable symbol body and thus in the first area. The first area is marked for a user by the optically activatable symbol body. Thus, a scanner function is created by the touch-sensitive surface, and the created scanner and its functions are indicated by the optically activatable symbol body. The first area may optionally additionally extend across a surface area of the light element that is not disposed above the optically activatable symbol body. In this case, the first area comprises the surface of the light element above the optically activatable symbol body.

The illumination unit is configured to emit visible light. The visible light is in a visible frequency range. The visible light may either be white light or comprise different colors, i.e., different visible frequency ranges. Visible light is used to illuminate or accentuate the interior of the vehicle. The visible light is here emitted into the light element. The visible light may spread in the transparent material of the light element and it is thus perceived by an observer that the entire light element is illuminated.

Further, the illumination unit is configured to emit electromagnetic radiation in the predetermined first frequency range into the light element together with the visible light. Thus, the electromagnetic radiation propagates in the light element when it is emitted from the illumination unit into the light element. Since the optically activatable symbol body is arranged in the transparent material of the light element, the first material is excited to emit visible light when the electromagnetic radiation in the first frequency range is emitted from the illumination unit into the light element.

According to the invention, the illumination unit is configured to emit visible light in a visible frequency range and electromagnetic radiation in the predetermined first frequency range into the light element. A distinction is therefore made between visible light and electromagnetic radiation. However, it should be noted that visible light is also electromagnetic radiation and that electrical radiation may also be a form of light that is visible or preferably invisible to humans. Preferably, a third frequency range lies between the visible frequency range and the first frequency range.

Preferably, the visible light emitted from the symbol body has a frequency range that is not identical to the visible frequency range in which the visible light is emitted from the illumination unit into the light element. In this case, the symbol body becomes visible to a user, as it stands out in colour against the illumination of the light element. Alternatively, the visible light emitted from the symbol body has the frequency range corresponding to the visible frequency range in which the visible light is emitted from the illumination unit into the light element. In this case, the symbol body becomes visible to a user, as it stands out with respect to brightness from the illumination of the light element.

It results that the light element as a whole emits visible light in the predetermined visible frequency range, and moreover, in the areas where the optically activatable symbol body is arranged, the light emitted from the optically activatable symbol body is additionally emitted when the electromagnetic radiation in the first frequency range is emitted from the illumination unit into the light element. In particular, the illumination unit is also configured to selectively emit exclusively the visible light in the predetermined visible frequency range or exclusively the electromagnetic radiation in the first frequency range into the light element.

In particular, it is enabled that a brightness of the area light decorative element for illuminating or accentuating the vehicle interior may be freely adjusted by controlling the emission of visible light in the predetermined visible frequency range by the illumination unit into the light element. At the same time, a control may be executed independently of how clearly the optically activatable symbol body is visible, whereby the optically activatable symbol body is optionally visible, for example, when the function that may be activated via the touch-sensitive surface is to be available. This is done by controlling the emission of electromagnetic radiation in the first frequency range by the illumination unit into the light element. The brightness of the light emitted by the optically activatable symbol element may therefore be adjusted together with the brightness of the visible light emitted by the area decorative element.

It is advantageous if the illumination unit is further configured to start, stop or vary in intensity the emission of the electromagnetic radiation in the predetermined first frequency range in response to a user touching the touch-sensitive surface in the first area. Thus, by emitting visible light through the optically activatable symbol body, an indicator is created which indicates whether touch contact between a user and the first area of the surface of the light element has been successfully detected.

It is further advantageous, if the illumination unit is further configured to increase or decrease an intensity of the emitted visible light in the predetermined visible frequency range together with an intensity of the electromagnetic radiation in the predetermined first frequency range, wherein a ratio between the intensities is predefined. This means that an intensity of electromagnetic radiation in the predetermined first frequency range, and thus a luminous intensity of the optically activatable symbol body, changes together with the intensity of visible light emitted into the luminous element in the visible frequency range. Thus, for example, a contrast ratio may be maintained between the activatable symbol body and the visible light emitted therefrom relative to the visible light emitted from the illumination unit into the light element. The ratio between the intensities is predefined here. This means that the ratio is determined based on a predefined rule. The ratio may either be predefined as a fixed numerical value, or the ratio may be defined, for example, by a curve defining the ratio of intensities for different intensities of visible light in the given visible frequency range. In this way, it is ensured that the position and function of the first area is effectively and clearly visibly displayed to the user at all times by the emitted light of the optically activatable symbol body, and that light emitted from the optically activatable symbol body is not outshone by the visible light emitted by the illumination unit into the light element in the predetermined visible frequency range.

It is further advantageous, if the predetermined first frequency range is in the nonvisible range, in particular in the infrared range or in the ultraviolet range. This ensures that the electromagnetic radiation emitted by the illumination unit into the light element does not affect the light used to illuminate the vehicle interior. Thus, in the case of light intended for illuminating or accentuating the interior of a vehicle, only the visible frequency range of visible light is relevant. The electromagnetic radiation necessary for the excitation of the optically activatable symbol body remains invisible to the user.

It is further advantageous if the illumination unit comprises at least one OLED, wherein the illumination unit is configured to generate the electromagnetic radiation in the first frequency range and/or the visible light in the visible frequency range by means of at least one OLED. By using an OLED, both the visible light in the predetermined visible frequency range and the electromagnetic radiation in the first frequency range may be irradiated into the light element particularly efficiently, since an OLED allows a higher degree of freedom in the design of the transitions between the illumination unit and the light element.

It is further advantageous if the illumination unit is configured to set an intensity of the emitted visible light in the visible frequency range and/or an intensity of the electromagnetic radiation in the predetermined first frequency range depending on an intensity of the ambient light. For this purpose, the illumination unit comprises, for example, a brightness sensor or is configured to receive a signal describing the intensity of the ambient light. For example, it is advantageous if the area light decorative element emits less light in a dark environment, for example at night, than in a bright environment, for example during the day. This prevents a driver of the vehicle from being blinded. At the same time, a contrast between the visible light emitted by the optically activatable symbol body and the visible light emitted by the illumination unit into the light element shall be obtained in the predetermined visible frequency range. In this case it is advantageous if the intensity of the emitted visible light in the visible frequency range and the intensity of the electromagnetic radiation in the predetermined first frequency range are both set depending on the intensity of the ambient light. Optionally, only the intensity of either the emitted light in the visible frequency range or the intensity of the electromagnetic radiation in the predetermined first frequency range and thus the intensity of the light emitted by the optically activatable symbol body is adjusted. This may lead, for example, to a calmer representation of an indicator for the first area.

Further, it is advantageous if the optically activatable symbol body is partially made of a non-transparent second material. Such an area is always visible to a user in the light element, and is particularly visible when the visible light is emitted into the light element in the predetermined visible frequency range. This is advantageous in order to meet safety requirements, for example, if a warning flashing function is to be activated by the first area of the touch-sensitive surface. If the optically activatable symbol body is partially made of a non-transparent material, the first area is clearly displayed even if there is a malfunction of the illumination unit.

It is also advantageous if the optically activatable symbol body is further at least partially made of a transparent optically activatable third material and is configured to emit visible light in response to the optically activatable symbol body being excited with electromagnetic radiation in a predetermined second frequency range, and the illumination unit is configured to emit electromagnetic radiation in the predetermined second frequency range into the light element. Preferably, the third material is selected such that it emits light in a different color when excited with the electromagnetic radiation in the predetermined second frequency range than when excited with the electromagnetic radiation in the predetermined first frequency range. This means that the optically activatable symbol body may emit light in different colors depending on which electromagnetic radiation is used to excite it, i.e., in the predetermined first frequency range or in the predetermined second frequency range. The optically activatable symbol body may thus appear as a multicolored indicator or a color-changing indicator in the area light decorative element.

It is also advantageous if the illumination unit is configured to be operated selectively in a first mode or in a second mode, wherein in the first mode the illumination unit emits only the visible light in the predetermined visible frequency range into the light element, and in a second mode same emits the visible light in the predetermined visible frequency range together with the electromagnetic radiation in the predetermined first frequency range into the area light decorative element. Thus, in the first mode, the electromagnetic radiation in the predetermined first frequency range is not emitted into the illuminant. It is thus enabled that the area light decorative element is used as a purely decorative element in the first mode. In the second mode, the area light decorative element is additionally used as a switching element. This allows the area light decorative element to be used both as a purely decorative element and as an interface for a user input.

It is also advantageous if the area light decorative element further comprises a further optically activatable symbol body which is at least partially made of a transparent optically activatable fourth material and is configured to emit visible light in response to the further optically activatable symbol body being excited with an electromagnetic radiation in a predetermined fourth frequency range, wherein the further optically activatable symbol body is disposed in the light element, and wherein the touch sensitive surface is further disposed in a second area of the surface of the light element above the further optically activatable symbol body to detect the touch of a user in the second area. Preferably, a touch contact of the first area may be distinguished from a touch contact of the second area. The predetermined fourth frequency range is preferably equal to the predetermined first frequency range. In this case, the illumination unit may excite both the optically activatable symbol body and the further optically activatable symbol body to emit visible light, wherein two different optically activatable symbol bodies are excited by the electromagnetic radiation in the predetermined first frequency range, since the first frequency range is equal to the fourth frequency range. Alternatively, it is advantageous if the predetermined fourth frequency range is different from the predetermined first frequency range. In this case, the illumination unit is preferably configured to emit electromagnetic radiation in the predetermined fourth frequency range into the light element together with the visible light in the predetermined visible frequency range. Preferably, the optically activatable symbol body and the further optically activatable symbol body may be excited to emit light independently of each other. In this way, different switching functions may be optionally displayed on the area light decorative element by means of the optically activatable symbol bodies.

Preferably, the first material and/or the third material and/or the fourth material is a material comprising a fluorescent transparent colorant, in particular $C_{23}H_{12}OS$. This material may be easily inserted into the light element in order to arrange the optically activatable symbol body within it. At the same time, this material has good characteristics to be easily excited by the illumination unit to emit visible light.

BRIEF DESCRIPTION OF THE FIGURES

Further details, features and advantages of the invention result from the following description and figures, which show.

DETAILED DESCRIPTION

Figure 1:
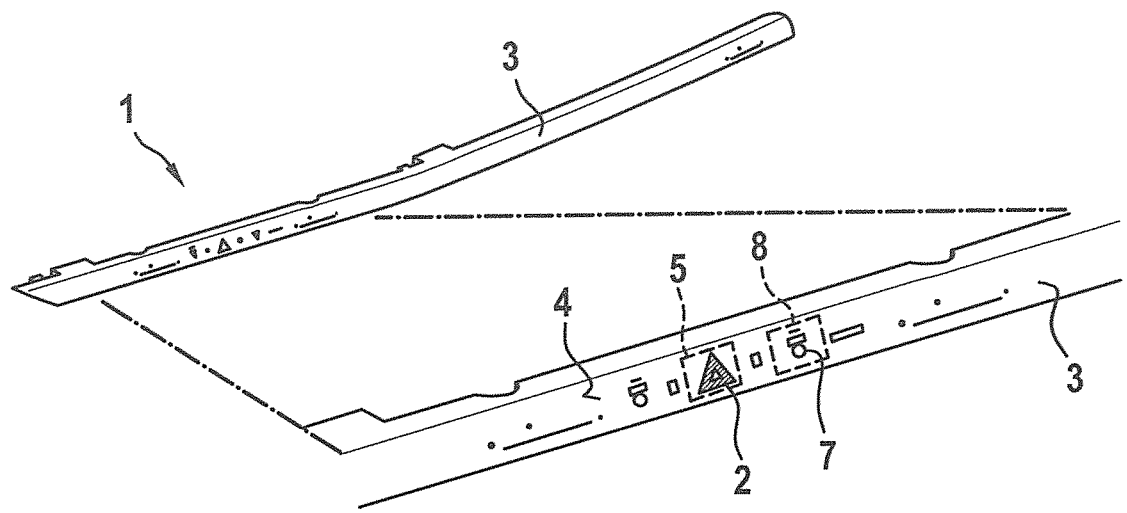
FIG. 1 an area light decorative element according to an exemplary embodiment of the invention, FIG. 2 a schematic representation of the area light decorative element according to the exemplary embodiment of the invention, and FIG. 3 a diagram showing an intensity of visible light emitted from the illumination unit and an electromagnetic radiation emitted from the illumination unit across a frequency range.

FIG. 1 illustrates an inventive area light decorative element 1 in accordance with an embodiment of the invention. The area light decorative element 1 comprises an optically activatable symbol body 2, a light element 3, a touch-sensitive surface 4 and an illumination unit 6. The area light decorative element further comprises another optically activatable symbol body 7. In this exemplary embodiment, the area light decorative element 1 is a strip which may be inserted into a driver's door of a vehicle. For this purpose, the light element 3 is suitably shaped to fit into a lining of the door. Furthermore, fastening elements are arranged on a rear side of the area light decorative element 1 in order to fasten it to the door.

Figure 2:
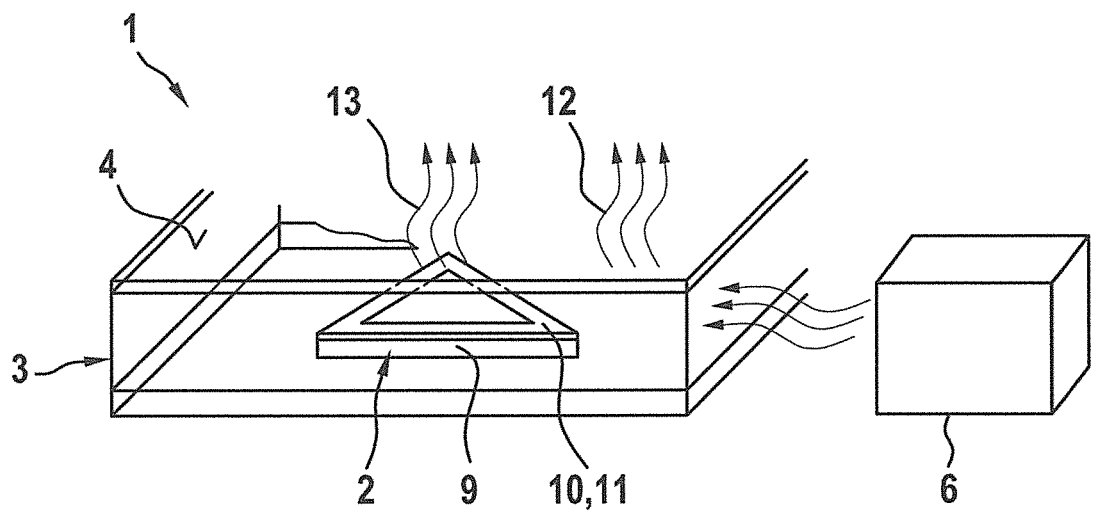

FIG. 2 shows a schematic view of the area light decorative element 1 shown in FIG. 1.

The light element 3 is made of a transparent material. For example, in this embodiment, the light element 3 is an injection molded element made of a transparent plastic. The transparent plastic, i.e., the transparent material, is either clearly transparent or has a cloudy appearance. Also, the transparent material may have a coloring by which a coloring of the illumination of a vehicle provided by the area light decorative element 1 may be achieved. In the embodiment described herein, the light element 3 is clear and does not exhibit any coloring. The optically activatable symbol body 2 is arranged in the light element 3. In this case, the optically activatable symbol body 2 is cast into the light element 3.

The optically activatable symbol body 2 consists of, at least in part, a transparent and optically activatable first material. The first material is, for example, $C_{23}H_{12}OS$. The first material is thus a transparent fluorescent colorant. This first material has the property that it emits visible light in response to the first material being excited with an electromagnetic radiation in a predetermined first frequency range 21. The first frequency range 21 is selected so that it lies outside the range of visible light. Thus, the first frequency range 21 is in particular in the infrared range or in the ultraviolet range. With the aforementioned exemplary first material, the first frequency range 21 is in the ultraviolet range. In this embodiment, the optically activatable symbol body 2 is transparent and clear. Thus, this is not visible in the light element 3 when the optically activatable symbol body 2 is not excited by the electromagnetic radiation in the predetermined first frequency range 21.

It may be seen from FIGS. 1 and 2 that the optically activatable symbol body 2 has the shape of a triangle. For this purpose, the optically activatable symbol body 2 is arranged in the light element 3 to indicate a switch function of the area light decorative element 1. This function is, for example, an activation of a hazard warning system of the vehicle in which the area light decorative element 1 is arranged. It should be noted that the shape of the optically activatable symbol body 2 shown in FIGS. 1 and 2 is chosen by way of example only. Any shape may be selected for designing the optically activatable symbol body 2.

To enable a switching function by the area light decorative element 1, the area light decorative element 1 comprises the touch-sensitive surface 4. The touch-sensitive surface 4 is, for example, a layer which is applied to the light element 3 and which enables capacitive detection of touches by a user. The touch-sensitive surface 4 is transparent. The touch-sensitive surface 4 is arranged at least in a first area 5 on the surface of the light element 3, which is arranged above the optically activatable symbol body 2. The fact that the first area is arranged above the optically activatable symbol body 2 means that, when the area light decorative element 1 is arranged with the light element 3 in a vehicle, the touch-sensitive surface 4 of the light element 3 is a user-side surface and the first area is, from a user's point of view, the part of the surface of the light element 3 that covers the optically activatable symbol body 2. In other words, this means that a user may attempt to press the optically activatable symbol body 2 in order to achieve activation of an associated function, for example the hazard warning system. It is understood that in this case the user does not come into direct contact with the optically activatable symbol body 2, but merely touches the touch-sensitive surface 4 of the light element 3 in the first area. The touch-sensitive surface 4 is thus configured to detect a touch of a user in the first area. The touch-sensitive surface 4 is thus suitable to detect whether a user is attempting to press the optically activatable symbol body 2.

The area light decorative element 1 further comprises the illumination unit 6. On the one hand, visible light in a predetermined visible frequency range 22 is generated by the illumination unit 6 and emitted into the light element 3. The predetermined visible frequency range 22 may comprise only a particular color of light or may produce the entire spectrum, i.e., white light. In this exemplary embodiment, the visible light is white light. The visible frequency range 22 is thus the entire frequency range of visible light, whereby the intensity of the individual frequencies may be distributed differently, resulting for example from the characteristics of a light source of the illumination unit 6. Thus, the light source for the visible light in the predetermined visible frequency range 22 is an OLED. The visible light in the predetermined visible frequency range 22 emitted by the illumination unit 6 into the light element 3 propagates in the light element 3 and is emitted by same into an interior of the vehicle. This emitted light is also referred to as area light 12, since same is emitted by the area light decorative element 1 over the entire surface of the light element 3.

The illumination unit 6 is further configured to emit electromagnetic radiation in the predetermined first frequency range 21 into the light element 3 together with the visible light in the predetermined visible frequency range 22. In this exemplary embodiment, the electromagnetic radiation is light in the ultraviolet range. The electromagnetic radiation in the predetermined first frequency range also propagates in the light element 3 and impinges upon the optically activatable symbol body 2. The same is excited by the electromagnetic radiation in the predetermined first frequency range to emit visible light. The same passes through the transparent light element 3 and exits at the user-side touch-sensitive surface 4 of the light element 3. The light emitted by the optically activatable symbol body 2 is also referred to as symbol light 13. The electromagnetic radiation in the predetermined first frequency range 21 is generated by an LED, in particular an OLED, in the illumination unit 6 and modulated onto the visible light in the predetermined visible frequency range 22. The visible light in the predetermined visible frequency range 22 and the electromagnetic radiation in the predetermined first frequency range 21 are thus emitted together by the illumination unit 6 into the lighting element 3.

The illumination unit 6 is further configured to start, stop or vary in its intensity the emission of the electromagnetic radiation in the predetermined first frequency range 21 in response to a user touching the touch-sensitive surface in the first area 5. For example, the area light decorative element 1 comprises corresponding electronics that change an intensity of electromagnetic radiation emitted by the illumination unit 6 in the predetermined first frequency range 21 in response to the first area 5 having been touched by a user. For example, an intensity of electromagnetic radiation in the predetermined first frequency range 21 is increased when the first area 5 has been touched by a user to activate a particular function. Accordingly, when a user touches the first area 5, the intensity of the electromagnetic radiation emitted by the illumination unit in the first frequency range is reduced to disable a corresponding associated function. This results, for example, in the optically activatable symbol body 2 lighting more brightly when a function has been activated and emitting light with a lower brightness when the corresponding function is not active, thereby continuing to indicate the location forming the first area 5.

In alternative embodiments, an intensity of the electromagnetic radiation emitted by the illumination unit 6 may also vary in the predetermined first frequency range 21, creating the impression that the optically activatable symbol body 2 is flashing, for example. This results from the fact that alternately more and less visible light is emitted from the optically activatable symbol body 2, as the same is excited to varying degrees.

The illumination unit 6 is further configured to set an intensity of the emitted visible light in the visible frequency range 22 and an intensity of the electromagnetic radiation in the predetermined first frequency range 21 depending on an intensity of an ambient light. The intensity of the ambient light is either detected by a brightness sensor in the area light decorative element 1 or is provided to the area light decorative element via a data signal. In this regard, the illumination unit 6 comprises electronics that control the illumination unit 6 to increase or decrease the intensity of the emitted visible light in the visible frequency range 22 with the intensity of the ambient light. Therefore, the area light decorative element 1 illuminates with lower brightness in a dark environment than in a bright environment. Thus, the surface light decorative element creates a visual accent in the interior of the vehicle, which is easily recognizable under different brightness conditions.

The illumination unit 6 is here further configured to increase or decrease an intensity of the emitted visible light in the predetermined visible frequency range 22 together with an intensity of the electromagnetic radiation in the predetermined first frequency range 21, wherein a ratio between the intensities is predefined. For example, each possible intensity of emitted light in the predetermined visible frequency range 22 is associated with an intensity of electromagnetic radiation in the predetermined first frequency range 21. In this regard, the ratio between the intensities may be defined for two different states, for example for a state in which the optically activatable symbol body 2 indicates that a function is active and another state in which the optically activatable symbol body 2 indicates that a function is inactive. It is thus achieved that the illumination provided by the area light decorative element 1, which is generated by the visible light irradiated into the light element 3 in the predetermined visible frequency range 22, is in a defined ratio with respect to the brightness of the light emitted by the optically activatable symbol body 2. This ensures that, irrespective of an intensity of the ambient light, both an appropriate illumination of the vehicle interior is achieved and the first area 5 and its function are clearly marked for a user.

As illustrated in FIG. 2, in this exemplary embodiment of the invention, the optically activatable symbol body 2 is further at least partially formed of a transparent optically activatable third material 11 which is configured to emit visible light in response to the optically activatable symbol body 2 being excited with electromagnetic radiation in a predetermined second frequency range 23. The predetermined second frequency range 23 is, for example, a frequency range which lies in the non-visible range, in this case in the infrared range. The optically activatable symbol body 2 is thus made of two different materials, which may be excited to emit light independently of each other. In this respect, the illumination unit 6 is configured to emit electromagnetic radiation in the predetermined second frequency range 23 into the light element 3. Thereby, the intensity of the radiation in the predetermined second frequency range 23 is either coupled to the intensity of the electromagnetic radiation in the predetermined first frequency range 21, or is controllable independently thereof. For example, it may be indicated whether a function is active by causing only the optically activatable first material 9 or the optically activatable third material 11 to illuminate. The respective other material may be permanently excited to emit light regardless of whether the associated function is active, thereby indicating the position of the first area 5 to the user at any given time.

Alternatively or additionally, the optically activatable symbol body 2 is partially made of a non transparent second material 10. Since this is not transparent or at least not completely transparent, the same is visible in the light element 3. In this way, it may be ensured that certain areas are detectable, for example, that the first area 5 is always detectable, even if there is a malfunction in the illumination unit 6 or, for example, an ambient light is so bright that the optically activatable symbol body 2 may no longer be detected even when visible light is emitted.

In FIG. 2, the non-transparent second material 10 and the transparent, optically activatable third material 11 are shown, wherein these are to be understood as alternatives. That is, the edge of the triangular optically activatable symbol body 2 shown in FIG. 2 is either non-transparent or emits visible light in response to electromagnetic radiation in the predetermined second frequency range 23. In further embodiments, the optically activatable symbol body 2 comprises a plurality of areas, wherein one area is made of the optically activatable first material 9, one area is made of the non-transparent second material 10, and another area is made of the optically activatable third material 11.

The illumination unit 6 is configured to be selectively operated in a first or in a second mode. In this regard, a control signal provided to the area light decorative element 1 may be used to select whether the illumination unit 6 is operated in the first mode or in the second mode.

In the first mode, only the visible light in the predetermined visible frequency range 22 is emitted into the light element 3. This means that neither electromagnetic radiation in the predetermined first frequency range 21 nor electromagnetic radiation in the predetermined second frequency range 23 is emitted into the light element 3. The area light decorative element 1 is thus a purely decorative element, as the first area 5 is not identifiable by the user, as there is no indication thereof. Only in the embodiments in which the optically activatable symbol body 2 is partially made of a non-transparent second material 10, the first area may be identified. By no longer indicating the first area 5 in the first mode, a particularly visually appealing appearance of the area light decorative element 1 is generated. For example, it is advantageous if the first mode is activated whenever the functions indicated by the optically activatable symbol body 2 are not required. This is the case, for example, when the vehicle is parked and not being operated, or when the vehicle is operated in an autonomous driving mode in which certain functions do not need to be activated by a user.

In the second mode, the visible light is emitted in the predetermined visible frequency range 22 together with the electromagnetic radiation in the predetermined first frequency range 21, into the area light decorative element 1, i.e., into the light element 3. The first area 5 is indicated by the first material 9 of the optically activatable symbol body 2 emitting light in this second mode. The corresponding vehicle functions associated with the first area may now be selected by the user.

The area light decorative element 1 preferably comprises another optically activatable symbol body 7. The same is also shown as an example in FIG. 1. The further optically activatable symbol body 7 is set up in accordance with the optically activatable symbol body 2. In this regard, the further optically activatable symbol body 7 preferably has a different geometric shape so that it may be distinguished by a user from the optically activatable symbol body 2. The further optically activatable symbol body 7 comprises, at least in part, a transparent optically activatable fourth material. The optically activatable fourth material is a material which emits visible light in response to the further optically activatable symbol body 7 being excited with an electromagnetic radiation in a predetermined fourth frequency range. In the exemplary embodiment of the invention shown in FIG. 1, the fourth material is equal to the first material 9 and the predetermined fourth frequency range is thus equal to the predetermined first frequency range 21. That is, both the optically activatable symbol body 2 and the further optically activatable symbol body 7 emit light when electromagnetic radiation in the predetermined first frequency range is emitted from the illumination unit 6 into the light element 3. In this regard, the illumination unit 6 may either be configured such that the optically activatable symbol body 2 and the optically activatable symbol body 7 are always excited together to emit light, or such that they may be excited separately from each other to emit light by two separate sources of electromagnetic radiation in the predetermined first frequency range. It is preferred here if the optically activatable symbol body 2 and the further optically activatable symbol body 7 may be excited to emit light independently of each other. If the first material 9 and the fourth material are different materials selected such that the first frequency range and the fourth frequency range are non-overlapping frequency ranges, emitting visible light of the two activatable symbol bodies 2, 7 may be achieved independently by the illumination unit 6 by emitting the electromagnetic radiation in the corresponding frequency range into the light element 3.

The further optically activatable symbol body 7 is arranged together with the optically activatable symbol body 2 in the light element 3, for example moulded together in the light element 3. In this case, the two optically activatable symbol bodies 2, 7 are arranged next to each other so that they do not obscure each other from the view of a user. The touch-sensitive surface 4 on the light element 3 comprises a second area 8, which is arranged above the further optically activatable symbol body 7. The touch-sensitive surface 4 is configured to detect a touch of a user in the second area 8. Thus, in the case of the area light decorative element 1 shown in FIG. 1, it is possible for a user to activate or deactivate different vehicle functions by pressing the optically activatable symbol body 2 or the further optically activatable symbol body 7 accordingly. In this case, the user does not come into direct contact with the respective optically activatable symbol body 2, 7, but only with the overlying area of the touch-sensitive surface 4, i.e., with the first area 5 or the second area 8.

Figure 3:
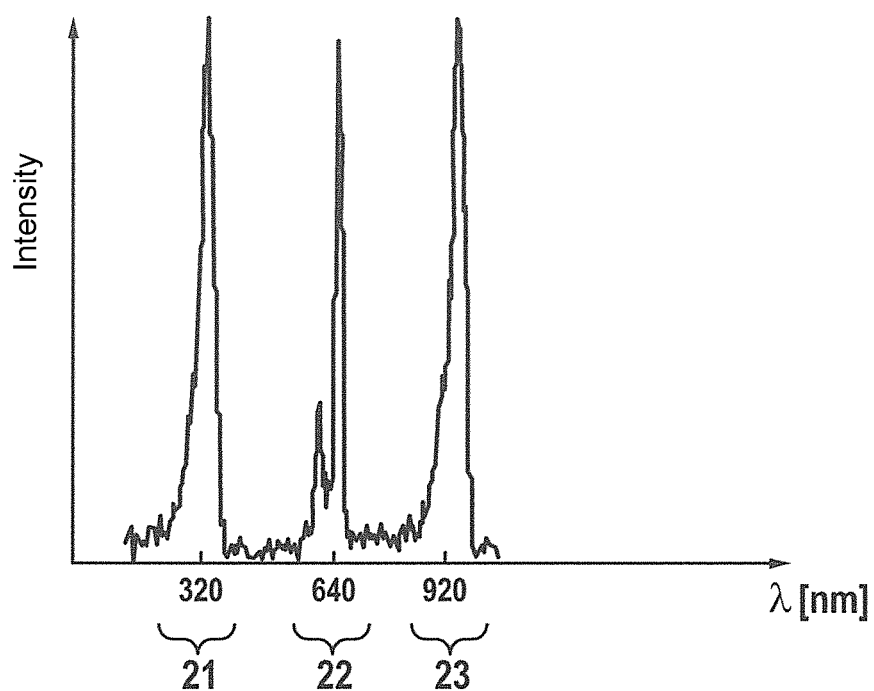

FIG. 3 shows a diagram illustrating the frequency ranges that may be emitted by the illumination unit 6. In this exemplary embodiment of the invention, the electromagnetic radiation is light in the ultraviolet or infrared range. Thus, it may be seen that the illumination unit 6 may provide light in the ultraviolet range, for example in the range of 320 nm, which corresponds for example to the first frequency range 21. Further, the illumination unit 6 is suitable to emit light in the visible range and thus in the predetermined visible frequency range 22, which is shown in FIG. 3 as a peak in the 640 nm wavelength range. Further, the illumination unit 6 is configured to emit light in the infrared range, which is in the 920 nm wavelength range, corresponding for example to the second frequency range 22. The predetermined visible frequency range 22 is here selected to provide illumination in a desired color in the interior of the vehicle. The light in the ultraviolet or infrared frequency ranges may either activate individual parts of a single optically activatable symbol body 2, 7 and thus excite them to emit light, or different optically activatable symbol bodies 2, 7 in the light element 3 may be excited to emit light independently of one another.

The area light decorative element according to the invention as shown in FIG. 1 thus consists of a touch-sensitive light element 3 into which a symbol is applied by means of the symbol body 2, which is excited to emit light by optical excitation. In this way, a situationally illuminated symbol is realized, which may be controlled depending on the ambient light, for example.

The optical excitation of the applied symbol occurs at a specific wavelength of the coupled light, which is preferably in the non-visible range (e.g., UV or IR range). The light element 3 is used for coupling the light, whereby the activation light necessary for activating the symbols is modulated onto the (visible) area light. Thus, modulation enables a targeted, high-contrast and adjustable activation of the symbols in the context of the area lighting.

FIG. 2 illustrates an exemplary arrangement of an applied symbol 2 in an area light decorative element 1, showing the coupled-in light, the coupled-out area light 12 and the coupled-out symbol light 13.

FIG. 3 shows an exemplary principal representation of the spectrum of the modulation of UV radiation and/or IR radiation in the spectrum of the visible area light 12. With the non-visible UV radiation and/or IR radiation, the situational activation of the visible symbol illumination, i.e., the symbol light 13, is realized in the context of the area lighting. Activation may here be triggered via a stored touch sensor system.

Preferably, transparent, fluorescent, UV- or IR-activatable substances such as $C_{23}H_{12}OS$, which are applied to the area light decorative element 1 by an injection molding process, are used as a material for the optically, situationally activatable symbol.

An advantageous embodiment of the area light decorative element 1 according to the invention comprises the use of OLED technology to implement the area light decorative element 1.

In the non-activated state of the symbol, due to the transparency of the material used, preferably no symbol is recognizable by the observer (so-called disappearance effect).

In addition to the optical activation of the symbol, magnetic or inductive activation is also possible by using suitable materials.

By means of the arrangement according to the invention, a monolithic combination of situationally illuminated symbols in area light decorations is realizable. This creates an integrated approach that allows for high-contrast, luminous symbols in a light context. In the deactivated state, it may be achieved in the area light decoration that no significant feature of the applied symbols is visually recognizable. The advantages here are a high contrast of the symbols in an illumination environment, new degrees of freedom in the design layout, a homogeneous appearance as well as the reduction of the complexity of the structure, which reduces the system costs and improves the quality characteristics.

In addition to the above written disclosure, explicit reference is made to the disclosure of FIGS. 1 to 3.

LIST OF REFERENCE NUMERALS

1 Area light decorative element
2 Optically activatable symbol body
3 Light element
4 Touch-sensitive surface
5 First area
6 Illumination unit
7 Further optically activatable symbol body
8 Second area
9 First material
10 Second material
11 Third material
12 Area light
13 Symbol light
21 First frequency range
22 Second frequency range
23 Third frequency range

The invention claimed is:

1. An area light decorative element comprising:
an optically activatable symbol body at least partially formed of a transparent optically activatable first material and configured to emit visible light in response to the optically activatable symbol body being excited with electromagnetic radiation in a predetermined first frequency range,
a light element consisting of a transparent material, wherein the optically activatable symbol body is arranged in the light element,
a touch-sensitive surface disposed in a first area of a surface of the light element above the optically activatable symbol body for detecting a touch of a user in the first area, and
an illumination unit which is arranged to emit visible light in a predetermined visible frequency range into the light element and, together with the visible light, also to emit electromagnetic radiation in the predetermined first frequency range into the light element.

2. The area light decorative element according to claim 1, wherein the illumination unit is further configured to start, stop or vary in intensity the emission of the electromagnetic radiation in the predetermined first frequency range in response to a user touching the touch-sensitive surface in the first area.

3. The area light decorative element according to claim 1, wherein the illumination unit is further configured to increase or decrease an intensity of the emitted visible light in the predetermined visible frequency range together with an intensity of the electromagnetic radiation in the predetermined first frequency range, wherein a ratio between the intensities is predefined.

4. The area light decorative element according to claim 1, wherein the predetermined first frequency range is in the non-visible range, in particular in the infrared range or in the ultraviolet range.

5. The area light decorative element according to claim 1, wherein the illumination unit comprises at least one OLED, wherein the illumination unit is configured to generate the electromagnetic radiation in the first frequency range and/or the visible light in the visible frequency range by means of the at least one OLED.

6. The area light decorative element according to claim 1, wherein the illumination unit is further configured to set an intensity of the emitted visible light in the visible frequency range and/or an intensity of the electromagnetic radiation in the predetermined first frequency range depending on an intensity of the ambient light.

7. The area light decorative element according to claim 1, wherein the optically activatable symbol body is further partially made of a non-transparent second material.

8. The area light decorative element of claim 1, wherein
the optically activatable symbol body is further at least partially formed of a transparent optically activatable third material and is configured to emit visible light in response to the optically activatable symbol body being excited with electromagnetic radiation in a predetermined second frequency range, and
the illumination unit is configured to radiate electromagnetic radiation in the predetermined second frequency range into the light element.

9. The area light decorative element according to claim 1, wherein the illumination unit is configured to be selectively operated in a first mode or in a second mode, wherein the illumination unit,
in the first mode, emits only the visible light in the predetermined visible frequency range into the light element, and
in the second mode, emits the visible light in the predetermined visible frequency range together with the electromagnetic radiation in the predetermined first frequency range into the area light decorative element.

10. The area light decorative element according to claim 1, further comprising:
a further optically activatable symbol body at least partially formed of a transparent optically activatable fourth material and configured to emit visible light in response to the further optically activatable symbol body being excited with electromagnetic radiation in a predetermined fourth frequency range,
wherein the further optically activatable symbol body is arranged in the light element, and
wherein the touch-sensitive surface is further arranged in a second area of the surface of the light element above the optically activatable symbol body for detecting a touch of a user in the second area.

* * * * *